Patented June 2, 1942

2,285,299

UNITED STATES PATENT OFFICE 2,285,299

PURIFICATION OF CAUSTIC

Irving E. Muskat and Fred D. Ayres, Akron, Ohio, assignors to Pittsburgh Plate Glass Company, Allegheny County, Pa., a corporation of Pennsylvania No Drawing. Application March 25, 1940, Serial No. 325,788

9 Claims. (Cl. 23—184)

This invention relates to the purification of aqueous solutions of alkali metal hydroxides and is particularly directed to the removal of silica therefrom. In the commercial preparation of sodium hydroxide solutions, particularly those prepared by the lime-soda process, it is often found that the solution is contaminated with a substantial amount of silica which renders the solutions objectionable for certain uses. Since sodium silicate is readily soluble in sodium hydroxide solutions, the removal of this impurity is found to be exceedingly difficult.

In accordance with our invention, we have found that the silica content of aqueous solutions of alkali metal hydroxides may be substantially reduced by treatment of the solution with ammonia. We have found that the solubility of silica in an aqueous sodium hydroxide solution containing a substantial quantity of ammonia is relatively low and that upon addition of ammonia or ammonia and water to a sodium hydroxide solution containing silica, the major portion of this impurity may be precipitated as a flocculent precipitate which may be removed in suitable manner, such as by settling or filtration.

The amount of ammonia required is dependent upon the amount of silica in the solution, the degree of purification desired, and upon the concentration of the solution. In general, it is preferred to avoid the separation of two liquid phases since precipitation of a substantial amount of silica does not appear to occur when two liquid phases are formed. Consequently, the use of such an excess of ammonia as to cause a separation of a liquid phase is preferably avoided. In general, from two to twelve parts by weight of NH₃ may be used in treating one part by weight of NaOH calculated upon the anhydrous basis. The actual amount required is determined to a large extent by the concentration of the solution or the amount of water present in the system.

In treating a solution containing 10–30 percent NaOH, 0.4–2.5 parts by weight of NH₃ per part of solution may be used. In general, silica precipitation is preferably secured from a system of sodium hydroxide-water and ammonia containing in excess of 15 percent by weight of ammonia and not substantially in excess of 30 percent sodium hydroxide, and in general, about two or more parts of water per part of NaOH is required. This process is particularly applicable in treating solutions wherein the silica content is relatively low, for example, below one percent by weight on the anhydrous basis.

The concentration of the solution to be treated may be widely varied although when highly concentrated solutions are treated, difficulty may arise in avoiding the separation of two liquid phases or precipitation of solid hydroxide. Consequently, when treating concentrated solutions containing, for example, 40 percent NaOH by weight or above, it is generally found desirable to dilute the solution or to add both water and ammonia during treatment. Since the solubility of many impurities is found to be at a minimum in a solution of sodium hydroxide having a concentration of 45–50 percent, it may often be desirable to preliminarily concentrate the solution to this value and thus remove a substantial amount of impurities such as sodium carbonate, sodium chloride, etc., by precipitation. The purified solution may then be diluted to cause precipitation of silica or treated directly with ammonia and water in accordance with our invention.

The amount of ammonia added should not be in such excess as to cause precipitation of solid sodium hydroxide. Silica is precipitated from a solution containing 0.4 percent silica on the anhydrous basis and the following compositions:

|  | 1 | 2 | 3 |
|---|---|---|---|
|  | Per cent | Per cent | Per cent |
| NH₃ | 69 | 63 | 40 |
| NaOH | 3 | 5 | 18 |
| H₂O | 28 | 32 | 42 |

Silica also precipitates from solutions of similar composition containing somewhat more water. The solution after removal of silica by settling and/or filtration may be recovered by any convenient means. Since the solutions in general, contain considerable water, the solubility of ammonia therein is high.

The removal of ammonia from such solutions is often difficult and expensive due to the large volume of liquid which must be distilled in order to secure complete recovery. In accordance with our invention, we have found that a substantial separation of sodium hydroxide from a liquor containing liquid ammonia, water and caustic may be secured by adding a further quantity of sodium hydroxide or a further quantity of ammonia thereto in order to cause a separation of two liquid phases, the heavier of which contains the major portion of sodium hydroxide, and the lighter of which contains the major portion of the ammonia. By adding sodium hydroxide or an aqueous sodium hydroxide having a concentration upward of about 50 percent to homogeneous solutions containing sodium hydroxide, water and ammonia, it is possible to obtain a separation of the described two liquid phases. In such a case, the resulting ammonia phase contains ammonia in concentration substantially higher than the ammonia concentration of the liquid undergoing treatment and the caustic phase contains most of the caustic which was in the initial solution. This process is adapted to treatment of homogeneous mixtures containing from 10 to 80 percent ammonia, 1 to 45 percent of NaOH and not more than about 80 percent water and which do not themselves tend to separate into two liquid layers.

In similar manner, it is possible to secure a substantial separation of sodium hydroxide and ammonia from aqueous mixtures containing the same by adding ammonia in order to produce a separation of the two liquid phases or a mixture of ammonia, caustic and water containing more ammonia and/or caustic than the solution undergoing treatment may be used to produce the two liquid phases which may be separated. Generally speaking, either caustic or ammonia or mixtures thereof with or without a small amount of water may be added to a homogeneous mixture of caustic, water and ammonia in order to adjust the composition of the mixture to produce a pair of liquid phases.

The range of compositions which separate into a pair of liquid phases varies in accordance with the temperature, being somewhat wider at higher temperatures than at lower temperatures. At a temperature of 60° C., mixtures containing the following compositions are found to separate into a pair of liquid phases:

| NaOH | 25% | 40% | 25% | 20% | 5% | 30 |
|---|---|---|---|---|---|---|
| $NH_3$ | 45 | 20 | 40 | 60 | 70 | 40 |
| $H_2O$ | 30 | 40 | 35 | 30 | 25 | 40 |

Thus, a mixture containing 8 percent sodium hydroxide, 33 percent water and 59 percent ammonia, such as may be derived by treatment of a 20 percent solution of sodium hydroxide with liquid ammonia may be mixed with an amount of a solution containing 75 percent NaOH and 25 percent water required to change the composition of the mixture to 27 percent NaOH, 43% $NH_3$ and 30% water and the mixture allowed to stratify at 60° C. In such a case, the lower layer contains over 85% of the NaOH in the initial solution in addition to the added sodium hydroxide and over 90 percent of the ammonia in the initial solution is in the upper phase.

Similarly, when a solution containing 35 percent sodium hydroxide, 15 percent ammonia and 50 percent water is mixed with sufficient liquid ammonia at 60° C. to change the total composition to 55 percent ammonia, 18 percent sodium hydroxide and 27 percent water, over 90 percent of the sodium hydroxide in the mixture is recovered in the lower layer and about two-thirds of the ammonia in the initial mixture is found in the upper phase in addition to that which was added to the mixture.

In accordance with one phase of our invention, solid hydroxides which are contaminated with silica may be leached or extracted with anhydrous liquid ammonia or ammonia-water mixtures to extract a substantial amount of sodium hydroxide without substantial extraction of silica. The resulting solution may then be removed, filtered, if desired, and the ammonia removed by suitable means, such as by release of pressure. The ammonia may then be pumped back into the extraction chamber. In this manner, highly purified sodium hydroxide may be continuously or intermittently produced in a simple manner using a relatively minor amount of ammonia. Anhydrous sodium hydroxide, hydrates thereof, such as the dihydrate, monohydrate, etc., or other form of solid hydroxide may be treated in this manner.

After removal of the silica by suitable methods, such as by filtration and/or decantation, the sodium hydroxide may be recovered in a convenient manner. We have found that an extremely pure product may be secured by crystallizing solid hydroxide, for example, in the form of a hydrate or ammoniate of sodium hydroxide or other alkali metal hydroxide from the solution containing the ammonia. It has been found that the presence of ammonia increases the solubility of certain impurities such as sodium chloride and that when sodium hydroxide hydrates are crystallized from such a mixture and the crystals washed and remelted an extremely pure product is produced. This crystallization may be carried out by cooling or by addition of a further quantity of ammonia.

The temperature of operation is preferably maintained sufficiently high to prevent precipitation of hydrates of sodium hydroxide until after the precipitated silica has been removed. Temperatures upward of 35° C. are found to be suitable although lower temperatures may also be used. After the removal of silica, however, the temperature may be lowered, if desired, in order to permit crystallization of hydrates as discussed above.

The ammonia introduced may be either in the gaseous or liquid state and may be conveniently added by means of a pump. The pressure maintained within the system may be capable of considerable variation so long as it is sufficiently high to insure the presence of sufficient ammonia to precipitate the silica. Pressures in excess of 100 pounds per square inch have been found to be suitable.

The following illustrate the invention:

Example I

One part by weight of a solution containing 18 percent by weight of sodium hydroxide and 0.4 percent silica on the anhydrous basis was treated with 1.3 parts by weight of liquid ammonia at a temperature of 60° C. and a pressure of 240 pounds per square inch. A white flocculent precipitate formed and settled to the bottom of the treating vessel and was removed. After the ammonia was removed from the solution, the solution was found to contain about 20 percent sodium hydroxide and only about 0.11 percent silica on the anhydrous basis.

Example II

One part by weight of a solution containing 30 percent by weight of sodium hydroxide and 0.4 percent by weight of silica on the anhydrous basis was treated with 2.8 parts by weight of a mixture containing 75 percent liquid ammonia and 25 percent water in a manner similar to the method described in Example I and a solution containing only 0.10 percent by weight of silica upon the anhydrous basis was obtained.

Example III

A 40 percent sodium hydroxide solution containing 0.4 percent silica was treated with liquid ammonia in the proportion of one part by weight of solution to 6.4 parts by weight of a mixture containing 72 percent by weight of liquid ammonia and 18 percent water at a temperature of 55° C. After removal of the silica precipitate, the solution contained but 0.07 percent by weight of silica.

While the specification refers particularly to sodium hydroxide solutions, it is understood that other alkali metal hydroxide solutions such as solutions of potassium or lithium hydroxide may be purified in a similar manner.

Although the invention has been described with reference to the specific details of certain embodiments thereof, it is not intended that such details shall be regarded as limitations upon the scope of the invention except insofar as included in the accompanying claims.

We claim:

1. A process of purifying an aqueous solution of an alkali metal hydroxide, containing a substantial amount of silica as an impurity, which comprises adding ammonia to the solution in an amount sufficient to cause precipitation of silica therefrom but insufficient to cause separation of two liquid phases, maintaining the temperature such that precipitation of a substantial portion of solid hydroxide does not occur, removing the precipitated silica from the solution and separating the ammonia from the purified solution.

2. A process of purifying an aqueous solution of a sodium hydroxide, containing a substantial amount of silica as an impurity, which comprises adding ammonia to the solution in an amount sufficient to cause precipitation of silica therefrom but insufficient to cause separation of two liquid phases, maintaining the temperature such that precipitation of a substantial portion of solid hydroxide does not occur, removing the precipitated silica from the solution and separating the ammonia from the purified solution.

3. A process of purifying an aqueous solution of an alkali metal hydroxide, containing a substantial amount of silica as an impurity, which comprises adding ammonia to the solution in an amount sufficient to cause precipitation of silica therefrom but insufficient to cause separation of two liquid phases, maintaining the temperature such that precipitation of a substantial portion of solid hydroxide does not occur, removing the precipitated silica from the solution, precipitating a solid hydroxide from the purified solution and separating said solid from at least a portion of the resultant mother liquor.

4. A process of purifying a concentrated aqueous solution of sodium hydroxide containing a substantial amount of silica and an impurity which comprises contacting said solution with sufficient ammonia and water to cause precipitation of said impurity, the amount of ammonia being insufficient to cause separation of two liquid phases, maintaining the temperature such that precipitation of a substantial portion of solid hydroxide does not occur, removing the precipitated impurity from the solution and separating the ammonia from the purified solution.

5. A process of purifying an aqueous solution of a sodium hydroxide, containing a substantial amount of silica as an impurity, which comprises adding ammonia to the solution in the proportion of two to twelve parts of $NH_3$ per part of anhydrous NaOH but insufficient to cause separation of two liquid phases to cause precipitation of silica, maintaining the temperature such that precipitation of a substantial portion of solid hydroxide does not occur, removing the precipitated silica from the solution and separating the ammonia from the purified solution.

6. A method of purifying an aqueous solution of sodium hydroxide containing a substantial amount of a sodium salt and silica as impurities which comprises concentrating said solution to a concentration of 45-50 percent, permitting a portion of said impurities to precipitate, adding ammonia to said solution in an amount sufficient to precipitate silica but insufficient to cause separation of two liquid layers, maintaining the temperature such that precipitation of a substantial portion of solid hydroxide does not occur, removing the precipitate formed and separating the ammonia from the purified solution.

7. A process of purifying an aqueous solution of an alkali metal hydroxide, containing a substantial amount of silica as an impurity, which comprises adding ammonia to the solution in an amount sufficient to cause precipitation of silica therefrom but insufficient to cause separation of two liquid phases, maintaining the temperature such that precipitation of a substantial portion of solid hydroxide does not occur, removing the precipitated silica from the solution and separating a major portion of the ammonia from the purified solution by adding sufficient alkali metal hydroxide thereto to cause formation of a pair of liquid phases and separating the phases.

8. A process of purifying an aqueous solution of an alkali metal hydroxide, containing a substantial amount of silica as an impurity, which comprises adding ammonia to the solution in an amount sufficient to cause precipitation of silica therefrom but insufficient to cause separation of two liquid phases, maintaining the temperature such that precipitation of solid hydroxide does not occur, removing the precipitated silica from the solution and separating a major portion of the ammonia from the purified solution, by adding sufficient ammonia thereto to cause formation of a pair of liuid phases and separating the phases.

9. A process of purifying an aqueous solution of an alkali metal hydroxide containing a substantial amount of silica as an impurity which comprises adding ammonia to the solution in an amount sufficient to cause precipitation of silica therefrom but insufficient to cause separation of two liquid phases, maintaining the temperature such that precipitation of a substantial portion of solid hydroxide does not occur, removing the precipitated silica from the solution and separating ammonia from the purified solution by adding a compound of the group consisting of ammonia and alkali metal hydroxide in amount sufficient to cause formation of a pair of liquid phases and separating the phases.

IRVING E. MUSKAT.
FRED D. AYRES.